United States Patent [19]

Russell et al.

[11] Patent Number: 4,913,761
[45] Date of Patent: Apr. 3, 1990

[54] METHOD FOR SEVERING AND SEALING THERMOPLASTIC MATERIALS

[75] Inventors: Patrick M. Russell, Freeland; Roger K. Pihlaja, Sanford; Timothy R. Woods, Midland, all of Mich.

[73] Assignee: The Dow Chemical Company, Midland, Mich.

[21] Appl. No.: 275,459

[22] Filed: Nov. 23, 1988

Related U.S. Application Data

[63] Continuation-in-part of Ser. No. 119,867, Nov. 13, 1987, abandoned.

[51] Int. Cl.$^4$ ............................................. B32B 31/18
[52] U.S. Cl. .................................... 156/251; 156/515
[58] Field of Search ................. 156/251, 515; 420/94, 420/95, 125, 126, 127, 181, 435, 459, 460

[56] References Cited

U.S. PATENT DOCUMENTS

| | | | |
|---|---|---|---|
| 2,711,779 | 6/1955 | Carland | 156/515 |
| 4,396,449 | 8/1983 | Tumminia | 156/515 |
| 4,612,165 | 9/1986 | Liu et al. | 420/460 |
| 4,647,427 | 3/1987 | Liu | 420/94 |

Primary Examiner—Caleb Weston

[57] ABSTRACT

A process and apparatus for severing and simultaneously sealing a plurality of plies of thermoplastic material to form bags for storing foods therein is provided. A severing and sealing element fabricated from a long range ordered alloy is used. The use of that alloy provides increased element life at higher operating temperatures while significantly reducing odor and off-flavor problems in the bags.

10 Claims, 2 Drawing Sheets

METHOD FOR SEVERING AND SEALING THERMOPLASTIC MATERIALS

CROSS-REFERENCE TO A RELATED APPLICATION

This application is a continuation-in-part of application Ser. No. 119,867 filed Nov. 13, 1987.

BACKGROUND OF THE INVENTION

This invention relates to the severing and sealing of thermoplastic materials, and more particularly to the use of a heating element operating at a temperature above about 1050° F. to simultaneously sever and seal edge portions of layers of thermoplastic material used to form bags or the like.

In the process of manufacturing thermoplastic bags or other containers which may include a thickened closure or other thickened sections of thermoplastic material, the bag stock is typically supplied in the form of a continuous web. In forming individual bags, portions of the thermoplastic material are severed from the web. These severed areas become the side seams for the bag and are typically sealed at the same time the material is severed from the web.

To accomplish this severing and sealing operation, a "cutter-sealer" element is used which is typically in the form of a metal alloy wire of circular or elliptical cross-section. To cut through and seal both the main body and thickened portions of the thermoplastic material, such as a polyethylene resin, the wire is heated to a temperature above about 600 degrees F., typically 800 to 900 degrees F., which is above the melting temperature of the material.

A significant problem with such prior art cutter-sealer elements was their relatively short lifespan. Because of the elevated temperatures of operation and stresses involved with severing the thermoplastic materials, prior cutter-sealer elements suffered from oxidation of the metal, creep and fatigue, and stress ruptures. Accordingly, operating temperatures were attempted to be kept low to increase element life. The down time of the equipment used for plastic bag production due to cutter-sealer element failure was significant, and frequent replacement of the cutter-sealer elements was expensive.

Another problem with such elements was that degraded polymer, created by the contact of the hot element with the thermoplastic resin, would result in the formation of waxy substances which would build up on the cutting and sealing equipment, thereby reducing its efficiency. Frequent cleaning of the equipment was required, with concomitant down time for the bag production operation.

Contact of the themoplastic resin with the hot element would also produce gaseous polymer degradation products during the severing and sealing operation. Some of those gaseous products would become entrapped on the surface or in the bags which were formed. The presence of such gaseous degradation products produced noticeable odors, as well as producing off-flavor problems for foods later stored within the bags.

More recently, there have been attempts to address these problems. For example, Tumminia, U.S. Pat. No. 4,396,449, addressed the wax buildup and fatigue problems on the sealing equipment by designing a cutter-sealer element profile having a much greater height than width. The Tumminia cutter-sealer elements were fabricated from nickel and/or chromium alloys such as Inconel 625 or Chromel A.

However, problems with such cutter-sealer elements do remain. Accordingly, the need still exists in the art for a cutting and sealing element and process which provides a long cutter element life, avoids wax buildup on the sealing equipment, and alleviates taste and odor problems.

SUMMARY OF THE INVENTION

The present invention meets that need by providing a method and apparatus for severing and sealing plies of thermoplastic materials. The present invention is ideally suited for a high speed process for cutting and sealing plastic films for forming bags or other containers, and particularly with respect to reducing taste and odor perceptions in food-grade plastic bags. The films may have integral plastic closure profiles, as for example, is taught in U.S. Pat. No. Re. 28,969.

In accordance with one aspect of the present invention, a process is provided for severing a plurality of plies of a thermoplastic material and simultaneously sealing the severed margins thereof. A cutting and sealing element is selected which has a length at least as long as the section of the thermoplastic material to be severed and sealed. Preferably, the cutting and sealing element will be in the form of a wire, although other configuration such as knife blades may be utilized.

The heating element is preferably fabricated from a long range ordered alloy such as nickel aluminide (Ni$_3$Al) alloy containing boron. Such long range ordered alloys are disclosed by Liu, U.S. Pat. No. 4,647,427 and Liu et al. U.S. Pat. No. 4,612,165, the disclosures of which are hereby incorporated by reference. Such long range ordered alloys possess desirable properties for operation at temperatures above about 1000° F. A preferred nickel aluminide alloy contains approximately 0.02% by weight boron. A preferred cross-section for the cutting and sealing element is an elliptical cross-section having a minor axis length of approximately 0.01 to 0.05 inches and a major axis length of about 0.075 to 0.5 inches. Of course, the cutting element may assume other shapes such as the ones disclosed in the above-mentioned patent to Tumminia, U.S. Pat. No. 4,396,449. A presently preferred cutting element has a generally elliptical cross-section with a minor axis length of about 0.035 inches and a major axis length of about 0.110 inches. The heating element is heated to a temperature above about 1050 degrees F., preferably to between about 1050 to 1600 degrees F., and most preferably to between about 1300–1600 degrees F. and then brought into proximity with the thermoplastic material to sever the plies and form a sealed edge. The heat from the element is generally sufficient to cause severing and sealing of the material without physically contacting the element, although some contact may occur at thickened portions (i.e., closure profiles) along the material.

Typically, the thermoplastic material will be supplied in the form of a continuous web of bag stock which is folded-over and placed across a support surface. Generally, the bag stock will have one or more thickened area such as the area where there are closure profiles. The cutting and severing element is positioned in a cavity beneath the support surface and, after being heated to its operating temperature, is moved into proximity with the web. The heat from the element severs and simultaneously seals a marginal edge of the bag, and the web is translated forward across the support surface so that the process can be repeated again.

The long range ordered alloys used for the cutting and sealing element in the practice of the present invention have been found to enable operation of the equipment at higher temperatures than previously possible. Surprisingly, operation at higher temperatures results in less buildup of waxy polymer degradation products as well as substantial elimination of odor and off-taste problems. Additionally, the preferred nickel aluminide alloy has been found to be more resistant to oxidation, high temperature creep, fatigue, tensile stress, and more uniform with respect to changes in electrical resistivity than previous cutter-sealer element materials, even though operating at higher temperatures.

Accordingly, it is an object of the present invention to provide a cutting and sealing element and process for severing and sealing plies of thermoplastic material which possesses long cutting element life, avoids wax buildup problems on equipment, and alleviates taste and odor problems. This, and other objects and advantages of the present invention, will become apparent from the following detailed description, the accompanying drawings, and the appended claims.

DESCRIPTION OF THE PREFERRED EMBODIMENTS

Figure 1:
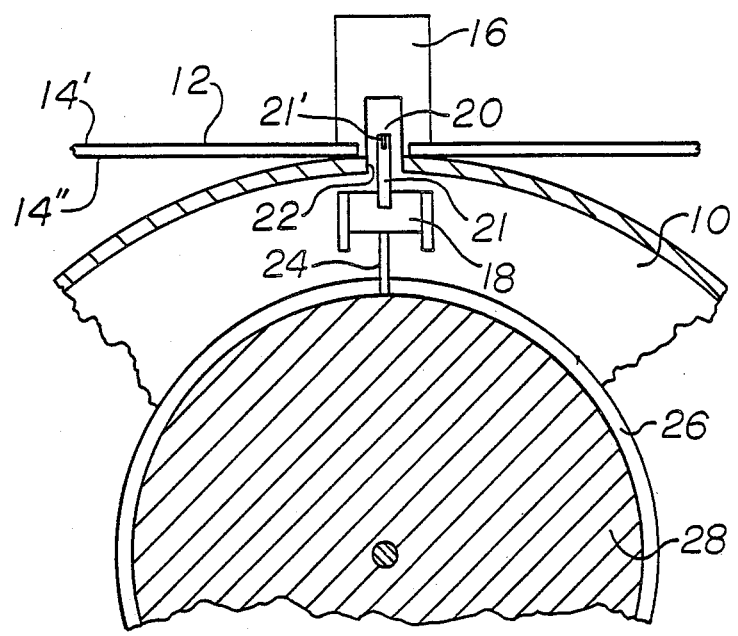
FIG. 1 is a schematic side view of a typical cutting and sealing apparatus which can incorporate the heating element and process of the present invention.

In order that the invention may be more readily understood, reference is made to the accompanying drawing figures which illustrate the environment in which the process of the present invention and improved cutting and severing element are found. FIG. 1 shows a device which is useful for making plastic bags or containers. A drum 10, which receives a supply of thermoplastic film or material 12, secures that material 12 to the drum by means of a vacuum. The thermoplastic material 12 comprises plies 14' and 14" of folded-over continuous web stock, which, after severing and sealing, form the opposing faces of individual bags. While a film having folded-over plies is shown, it will be apparent to those skilled in this art that the present invention may be practiced using multiple films or a film having multilayer plies.

A clamp 16 is moved into position to secure material 12 to drum 10 directly over a movable mechanism 18 which carries cutting and sealing element 20. Thus, material 12 is clamped immediately adjacent the area in which it is to be severed and sealed and is supported by drum 10. After cutting, clamp 16 is released. Elongated cutting and sealing element 20 is secured to post 21 which has a notch 21' therein. Several such clamp and mechanism combinations may be located about the periphery of drum 10 if desired. As shown, element 20 is at least as long as the thermopastic material 12 to be severed, and preferably extends somewhat beyond either edge of material 12.

Mechanism 18 slides inwardly and outwardly within drum cavity 22 as determined by the connector 24 as it rides along groove 26 formed about the peripheral edge of eccentric cam 28. As illustrated in FIG. 1, the mechanism 18 is in its outermost position. After being cut and sealed by mechanism 18, material 12 is thereafter cooled on drum 10 and taken off as bags. The bags are then collected and boxed.

Figure 2:
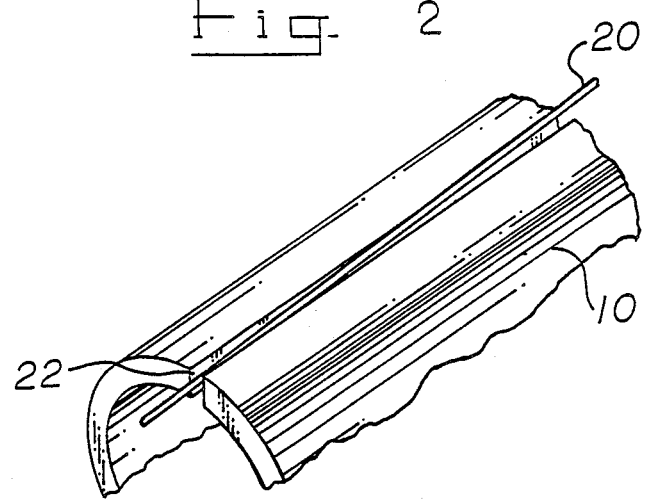
FIG. 2 is an isometric view from one end of the apparatus of FIG. 1.
Figure 3:
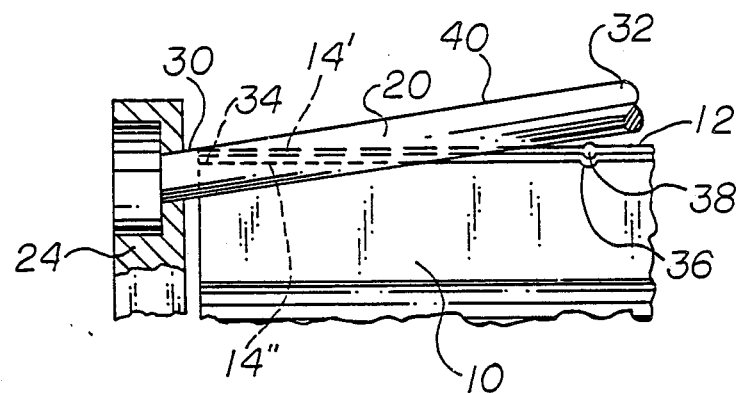
FIG. 3 is a greatly enlarged plan view illustrating the mechanism for translating the wire to contact the thermoplastic material.

The details of operation of cutting and severing element 20 within cavity 22 of drum 10 are best shown in FIGS. 2 and 3. It can be seen that cutting and severing element 20 is carried adjacent the ends of the drum and is supported so that its end 30 is supported lower in cavity 22 than its portion 32 adjacent the thicker section of thermoplastic material 12. This is accomplished by making the support post 21 a different length than its corresponding post (not shown) at the opposite end of mechanism 18. Cutting and severing element 20 is heated through its end connector 24 by conventional means (not shown).

As best illustrated in FIG. 3, drum surface 34 contains a groove 36 for carrying a thickened thermoplastic section or protrusion 38, such as a zipper closure profile for engaging opposing plies 14' and 14" of thermoplastic material 12. Shown above thermoplastic material 12 is the cutting and severing element 20 which is shown in its position after having passed through both plies 14' and 14", simultaneously severing and sealing their edges. The rise of cutting and severing element 20 across drum 10 is higher in the portion 32 than it is at opposite end 30 in the manner illustrated.

In actual practice, edge 40 which forms the top edge of element 20 is illustrated at about the uppermost preferred limit for travel. This limit is reached where the end 30 has just slightly passed through thermoplastic material 12. The fact that cutting and severing element 20 may be put under strain and held down somewhat as it passes through thickened profile portion 38 is the reason that the suspension of element 20 is preferably higher at that end of mechanism 18.

Also, in a high speed process, if element 20 rises too far after it passes through the thermoplastic material, there may be a tendency as the thermoplastic film relaxes to be frictionally engaged by element 20 and pulled and degraded by the heat from element 20. This can be avoided by stopping element 20 at a desired height after it has passed through the thermoplastic film plies. For example, in a preferred embodiment, the rise of edge 40 may be about 50 to 60 mils above drum surface 34 at end position 32 and only about 20 to 25 mils at opposite end position 30.

Severing and cutting element 20 is preferably fabricated of a boron-doped nickel aluminide alloy ($Ni_3Al$). It has been found that such alloys may be long range ordered alloy such as heated to temperatures above about 1050 degrees F., preferably to between about 1050 to 1600 degrees F. and most preferably about 1300 to 1600 degrees F. While the alloy can withstand temperatures up to about 1900 degrees F., it is preferred to operate element 20 at a temperature below 1900 degrees F. to obtain a longer operational life for element 20. Suitable nickel aluminide alloys are disclosed in Liu et al. U.S. Pat. No. 4,612,165, previously incorporated by reference. Preferably the alloy has the following composition by weight:

| Element | Weight % |
| --- | --- |
| Aluminum | 9–12 |
| Chromium | 0–5 |
| Iron | 0–10 |
| Boron | 0.015–0.03 |
| Hafnium | 0.03–0.06 |
| Nickel | balance |

The alloy may be formed as a rod and then drawn into a wire. The wire may have a circular or elliptical cross-section, or may have any of the several cross-sections disclosed by Tumminia, U.S. Pat. No. 4,396,449. Preferably, element 20 is drawn to a relatively small elliptical cross-section in the range of from about 0.01 to 0.05 inches for the length of the minor axis and from about 0.075 to 0.5 inches for the length of the major axis.

Use of a long range ordered alloy as severing and sealing element 20 in the practice of the present invention provides several distinct advantages over previously used materials such as Inconel 625, Inconel X750, nichrome, and Hastelloy. Present heating elements may normally be operated in the range of about 1050 to about 1200 degrees F. Operation at higher temperatures is not practical because the element materials exhibit a high failure rate. Even at present operating temperatures, the present elements have limited lifespans due to oxidation, high temperature creep, fatigue, and changes in electrical resistivity.

Properties for alloys or compounds suitable for use as cutting and sealing element 20 include creep resistance, oxidation resistance, fatigue resistance and high tensile yield strength at desired operating conditions. Inadequate performance by alloy or compound in any one of these properties at the desired conditions can render said material unsuitable for use as an element even though its performance may be acceptable with respect to other properties.

Creep refers to the non-elastic stretching of a severing and sealing element resulting from the tensile stress exerted upon it by the greater apparatus containing it. After a certain degree of elongation has occurred, that degree depending upon the apparatus in which the element is incorporated, the element is rendered unusable. It has been found that creep does not occur to a degree significant to render the element unusable if the tensile stress imposed upon the element does not exceed about 10 percent of the yield strength. Thus, if a material can be found that has a sufficiently high yield strength at desired operating temperatures, fatigue resistance can be enhanced without exacerbating the problem of creep. Long ordered alloys exhibit such superior yield strength compared to other materials presently utilized in severing and sealing elements, and, further, have the additional desirable characteristic of increasing yield strength as a function of increasing temperature up to about 1600° F. as seen in Liu et al., U.S. Pat. No. 4,612,165. Most conventional element materials exhibit neither the yield strength of long ordered alloys nor the desirable characteristic of yield strength increase with temperature.

Fatigue resistance refers to the mechanical failure of a cutting and sealing element from formation of minute fractures and fissures in the middle portion of the element from the elliptical oscillation or vibration of the element. The element oscillates due to magnetic flux created by the flow of electric current therethrough. Sealing apparatuses, such as disclosed in Tumminia, U.S. Pat. No. 4,396,449, and Carland, U.S. Pat. No. 2,711,779, have metallic drums or equivalent metallic positioning devices and other general structure of metallic composition which attract magnetic flux created within the element. The oscillation of the element, which is normally on the order of 60 cycles per second, creates stress in the middle portion of the element because the ends of the element are normally held in tensile stress by mechanical means. The fractures and fissures created by the stress eventually result in mechanical failure of the element.

Fatigue resistance of a cutting and severing element can be enhanced by lowering the amplitude of oscillation of the element by increasing the tensile stress exerted upon the element. Increasing the tensile stress, however, increases creep in the element; therefore, the fatigue resistance and creep of presently used elements has to be balanced and optimized to yield the longest operable life. The long ordered alloys of the present invention however, have such high tensile yield strengths that a tensile stress can be applied to element 20 that greatly reduces the oscillation amplitude without exceeding the 60% threshold of tensile yield strength that results in exacerbation of creep. Thus, incorporation of long ordered alloys in element 20 results in fatigue resistance and creep resistance performance far exceeding that of presently used elements.

Oxidation refers to conversion of severing and sealing element materials to their oxide derivatives. Oxidation is a direct function of element temperature and oxygen content of the gaseous ambient environment. Oxidation first occurs on the surface of the element and proceeds inward. Oxidation can exacerbate the problem of creep due to progressive diminution of the cross-sectional area of the element.

A further important property to be considered in the selection of an alloy or compound for use as cutting and sealing element 20 is uniformity of electrical resistance. Rapid changes in temperature caused by the electric current can alter the crystal or lattice structure of many types of element materials over time to an extent that the electrical resistance of the material varies markedly over time. Though electrical current applied to the element 20 can be adjusted to compensate for those resistance changes, this continual need for adjustment creates undesirable process control problems and difficulties. Cutting and sealing elements 20 formed from long ordered alloys in accordance with the present invention offer electrical resistance uniformity characteristics superior to those previously known in the art. A preferred element comprising a long ordered alloy has less than about a twenty percent change in resistivity over a period of 300 hours exposure. A most preferred element comprising a long ordered alloy has less than about a ten percent change over a period of 300 hours of exposure at 1500° F.

Alloys and compounds presently utilized in severing and sealing elements do not offer the combination of superior properties of the long ordered alloys of the present invention. While some of the previously known materials may offer equivalent performance in one or more of the properties of creep resistance, oxidation resistance, fatigue resistance, and tensile yield strength, none of these materials offer the performance of the long ordered alloys in all the stipulated performance areas. Previous element materials likewise do not offer the superior performance in a combination of properties and the further important property of uniformity resistivity. A preferred long ordered alloy for use as a severing and sealing element comprises $Ni_3Al$ having at 1500° F. a creep of less than about $2 \times 10^{-5}$ hr$^{-1}$ at about 4.5 ksi, oxidation resistance in air of less than about 10 grams per square centimeter for 300 hours exposure, fatigue resistance of $10^7$ cycles at about 10 ksi and tensile strength of greater than about 50 ksi. A most preferred $Ni_3Al$ has at about 1500° F. a creep of less than about $1 \times 10^{-5}$ hr$^{-1}$ at about 4.5 ksi, oxidation in air less than about 5 grams per square centimeter for 300 hours exposure, fatigue resistance of about $10^7$ cycles at about 25 ksi, tensile yield strength of about 70 ksi and resistivity changes of less than about 10 percent for 300 hours exposure.

Whether long ordered alloys, incuding $Ni_3Al$, meet the desired performance criteria of the present invention depends to an extent on the purity of the alloy composition and the fabrication techniques utilized. Why some long ordered alloys do not meet the desired performance criteria of the present invention is not well understood, but it is believed that those alloys have a greater proportion of free nickel than those that do meet the criteria. Various nickel aluminide severing and sealing elements have been tested at tensile stresses ranging from about 3.3 to about 4.6 ksi and temperatures ranging from about 1480–1580 F., and have found steady state creep rates ranging from about $1.1 \times 10^{-3}$ hr$^{-1}$ to less than about $2 \times 10^{-5}$ hr$^{-1}$ to virtually zero. Long ordered alloys that meet the desired performance criteria of the present invention include nickel aluminide alloy numbers V-360E, V-348, and IC 221 of Armada Research Corporation.

TABLE 1

Comparison of High Temperature Physical Properties of Various Materials Utilized in Severing and Sealing Elements

| Alloy Type | (a) Creep (hr) | (b) Yield Strength (ksi) | (c) Oxidation (gms/cm$^2$) | (d) Fatigue Resistance (ksi) |
|---|---|---|---|---|
| Nichrome | 1–2 | 18 | 180 | ~0 |
| Inconel X750 | 80 | 30 | 15 | 3 |
| Inconel 625 | 1–2 | 42 | 22 | 37 |
| Hastalloy C | 50 | 28 | 9 | 12 |
| Waspalloy | 110 | 84 | 3–4 | 5 |
| Rene 95 | 85 | 90 | ~0 | 7 |
| Udimet | 1–5 | 93 | 1–2 | 17 |
| ($Ni_3Al$) IC221 | 1000 | 125 | ~0 | 70 |

(a) Time to rupture at 20 ksi tension and 1500° F.
(b) At 1500° F.
(c) Grams metal oxidized per cm$^2$ exposed per 300 hrs. exposure at 1832° F.
(d) Rupture stress at $10^7$ cycles at 1500° F.

Table 1 illustrates comparative performances of representative materials presently incorporated in severing and sealing elements and the preferred nickel aluminide element of the present invention under the stipulated conditions. For purposes of Table 1, creep was measured as a function of rupture time at stipulated tension load and temperature rather than proportional linear expansion as a function of reciprocal time as used elsewhere in the specification.

At present temperatures of operation, some polymer degradation occurs when the hot element passes through the thermoplastic web producing compounds which build up on equipment and/or produce off-flavors or odors in the bags. In many instances, visible smoke is generated. Over time, waxy compounds build up on the surface of the equipment necessitating down time for clean up. Also, some of the off-flavor producing compounds find their way onto the surface and into the interior of the bags, which causes perceptible odor problems as well as imparting off-flavors to foods stored within.

We have found that operation of the element at higher temperatures above about 1300 degrees F., and preferably about 1300 to 1600 degrees F., significantly reduces the evolution of smoke during the severing and sealing operation with a concomitant reduction in buildup of waxy compounds, odors, and off-flavors in food stored within the bags. While not wishing to be bound by any specific theory, we believe that the higher temperatures of operation made possible by the use of the long range ordered alloy element results in significantly greater polymer degradation. This, in turn, results in lower molecular weight degradation products being formed resulting in less buildup of waxy solids and less production of sensorially offensive compounds.

Additionally, such lower molecular weight products are believed to have higher diffusion rates so that if entrapped within the bags, the products will quickly diffuse out. Finally, at the higher operating temperatures, there is believed to be less physical contact between the element and the thermoplastic web. That is, the heat from the element as it approaches the web will tend to sever and seal the web with little or no actual physical contact. This reduces the buildup of waxy solids on the element.

Not only do the long range ordered alloy elements permit higher temperatures of operation than heretofore possible, but it has been found that even at such high temperatures, such alloys are more resistant to oxidation, high temperature creep, and fatigue and more uniform with respect to changes in electrical resistivity than prior elements.

In order that the invention may be more readily understood, reference is made to the following examples, which are intended to illustrate the invention, but are not to be taken as limiting the scope thereof.

EXAMPLE 1

A 0.03 inch diameter nickel aluminide doped with boron alloy wire was installed on a hot wire severing and sealing machine as illustrated in the drawing figures. Wire temperatures were controlled by controlling the amperage to the wire. Actual wire temperatures were measured with an optical pyrometer. Tests were run at wire temperatures of 1050 and 1600 degrees F., respectively. Eighty sample one quart storage bags made of polyethylene having 0.010 inch thick plies were produced at each temperature. The samples were boxed into four dispensers, with 20 bags to a dispenser.

Taste tests were then administered to panelists as follows. Bags made at each temperature were tested by selecting four bags from each dispenser and placing approximately 15 grams of crushed potato chips in each bag. The bags were then zipped closed, individually wrapped in waxed paper to keep bag odors in and room odors out, and stored at constant temperature for 24 hours. Potato chips were used as the test medium as the oil from the chips tends to absorb any orders within the bags.

After 24 hours, the chips from each bag were placed on paper plates, and along with 2 plates of control chips, were arranged on a tray. One of the control samples was labeled as such while the other was used as a hidden control. Ten panelists were then asked to compare the flavor of each sample of chips with the control sample. For each sample, the panelists checked "yes" if they agreed that the test sample tasted the same as the control sample. If a panelist detected an off taste, the panelist checked "no", and degree of off taste was indicated as either slight, medium, or strong. The percentage of off taste detection was then calculated by dividing the number of "no's" irrespective of degree of off taste, by the total number of responses. The results were then averaged for each wire temperature and are reported in Table 2 below. The tests were repeated after 9 and 16 days, respectively. Based on previous tests, an approximately 8% rate of detection is expected for chips which have been wrapped in unsealed plastic film.

TABLE 2

| Wire Temp. (Deg. F.) | % Taste Detection | | |
|---|---|---|---|
| | 2 Days | 9 Days | 16 Days |
| 1050 | 73 | 60 | 35 |
| 1600 | 43 | 8 | 10 |

As can be seen, the higher wire temperature resulted in a significant reduction in the perception of off tastes or flavors.

EXAMPLE 2

Additional taste tests were performed utilizing the same test procedures as in Example 1. A 0.03 inch diameter nickel aluminide doped with boron wire was used as the severing and sealing element. Wire temperatures were controlled and measured as in Example 1. Bag samples were 15 count quart width, gallon depth polyethylene containers. Wire temperatures of 600°, 1000°, 1400° and 1600° F. were studied. The results are reported in Table 3 below.

TABLE 3

| Wire Temp. (Deg. F.) | % Taste Detection | | | |
|---|---|---|---|---|
| | 2 Days | 9 Days | 16 Days | 23 Days |
| 600 | 100 | 78 | 43 | 55 |
| 1000 | 78 | 80 | 60 | 78 |
| 1400 | 48 | 30 | 18 | 28 |
| 1600 | 83 | 60 | 38 | 33 |

As can be seen, the higher wire temperatures, namely 1400° and 1600° F., resulted in a significant reduction in the perception of off tastes or flavors as compared with lower wire temperature. Operation at 1400° F. produced the best results.

EXAMPLE 3

Experimental runs were made to quantify the presence of certain volatile aldehyde compounds which are formed as degradation products when the polyethylene bag stock material is severed and sealed by a hot wire cutting element. Such aldehyde compounds are believed to contribute to the off-tastes and flavors perceived by consumers of foods stored within such bags, with threshold effects in the parts per billion range.

The same test conditions as reported in Examples 1 and 2 above were utilized. The gases inside of quart width, gallon depth polyethylene bags were identified and quantified using liquid chromatography techniques. In this example, analysis was made for this presence of the six carbon aldehyde hexanal.

Taste tests were made as in Examples 1 and 2 above. The results are reported in Table 4 below.

TABLE 4

| Wire Temp. (deg. F.) | C(6) Concentration (ppb) | % Taste Detection (1 day) |
|---|---|---|
| 600 | 650 | 100 |
| 1000 | 115 | 78 |
| 1400 | 45 | 48 |
| 1600 | 90 | 83 |

As can be seen, a rough correlation is established between wire temperature, C(6) concentration, and off-taste perception, with generally higher wire temperatures producing lesser concentrations of such degradation compounds and fewer perceptions of off-tastes. However, operation at 1600° F. did not produce as good results as operation at 1400° F.

EXAMPLE 4

Experimental runs were made to quantify the presence of certain volatile aldehyde compounds which are believed to form as degradation products during the hot wire severing and sealing of polyethylene bags. Such aldehyde compounds are believed to contribute to the off-tastes and flavors perceived by consumers of foods stored within such bags.

The same test conditions as reported in the previous examples were utilized. The gases inside quart width, gallon depth polyethylene bags were identified and quantified using liquid chromatography techniques. Analyses were made for the presence of five, six and seven carbon aldehydes (i.e., pentanal, hexanal, and heptanal). The results are reported in Tables 5A and 5B below.

TABLE 5A

| Wire Temp. (deg. F.) | C(5) Concentration (ppb) | C(6) Concentration (ppb) | C(7) Concentration (ppb) |
|---|---|---|---|
| 1150 | 675 | 600 | 620 |
| 1250 | 145 | 290 | 220 |
| 1350 | 60 | 125 | 105 |
| 1450 | 80 | 25 | 90 |
| 1550 | 80 | 130 | 175 |

TABLE 5B

| Wire Temp. (deg. F.) | % Taste Detection | |
|---|---|---|
| | 8 Days | 1 Day |
| 1150 | — | 98 |
| 1250 | 85 | 88 |
| 1350 | 70 | 80 |
| 1450 | 48 | 83 |
| 1550 | 18 | 73 |

As can be seen, a correlation is established between wire temperature, degradation compound concentration, and off-taste perception with generally higher wire temperatures producing lesser concentrations of such compounds and fewer perceptions of off-tastes. Somewhat surprisingly, at the highest temperature tested, the measured concentration of degradation products increased somewhat, although it remained lower than at low wire temperatures (i.e., 1250° F. and below). The test data for this and the previous examples indicate a rough range of wire temperatures from about 1300° to 1600° F., with 1400° as the optimum as an optimum range for minmimizing the production of aldehyde degradation products and off-taste perceptions.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for severing a plurality of plies of a thermoplastic material and simultaneously sealing the severed margins thereof comprising the steps of:
   (a) selecting a cutting and sealing element having a length at least as long as the section of thermoplastic material to be severed and sealed,
   (b) heating said element to a temperature above about 1300 degrees F., the element having at about 1500 degrees F. a creep of less than about $2 \times 10^{-5}$ hr$^{-1}$ at about 4.5 ksi, an oxidation resistance in air of less than about 10 grams/cm$^2$ per 300 hours exposure, a fatigue resistance of about $10^7$ cycles at about 10 ksi, and a tensile yield strength of greater than about 50 ksi, and
   (c) bringing said element into proximity with said thermoplastic material to sever said plies and form a sealed edge.

2. The process of claim 1 in which the element further has at about 1500 degrees F. a resistivity change of less than about 20% per 300 hours exposure.

3. The process of claim 1 in which said heating element has at about 1500 degrees F. a creep of less than about $1 \times 10^{-5}$ hr$^{-1}$ at about 4.5 ksi, an oxidation resistance in air of less than about 5 grams/cm$^2$ per 300 hours exposure, a fatigue resistance of about $10^7$ cycles at about 25 ksi, a tensile yield strength of greater than about 70 ksi, and a resistivity change of less than about 10% per 300 hours exposure.

4. The process of claim 1 in which said heating element is in the form of a wire.

5. The process of claim 4 in which said heating element has an elliptical cross-section.

6. The process of claim 5 in which said heating element has a minor axis length of approximately 0.01 to 0.05 inches and a major axis length of approximately 0.075 to 0.5 inches.

7. The process of claim 1 in which said heating element is in the form of a knife blade.

8. The process of claim 4 in which said heating element has a circular cross-section and a dimeter of about 0.03 inches.

9. The process of claim 1 in which said element is heated to a temperature of from about 1300 to 1600 degrees F.

10. The process of claim 1 including the step of clamping said thermoplastic material adjacent the area thereof to be severed and sealed.

* * * * *